(12) United States Patent
Palmer

(10) Patent No.: US 11,154,804 B2
(45) Date of Patent: Oct. 26, 2021

(54) WATER EXTRACTORS AND METHODS OF MAKING WATER EXTRACTORS

(71) Applicant: Hamilton Sundstrand Corporation, Charlotte, NC (US)

(72) Inventor: Nigel G. M. Palmer, West Granby, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 258 days.

(21) Appl. No.: 16/213,555

(22) Filed: Dec. 7, 2018

(65) Prior Publication Data
US 2020/0179851 A1 Jun. 11, 2020

(51) Int. Cl.
*B01D 45/16* (2006.01)
*B01D 53/26* (2006.01)
*B64D 13/06* (2006.01)

(52) U.S. Cl.
CPC .......... *B01D 45/16* (2013.01); *B01D 53/265* (2013.01); *B64D 13/06* (2013.01); *B64D 2013/0674* (2013.01); *B64D 2013/0688* (2013.01)

(58) Field of Classification Search
CPC ...... B01D 45/16; B01D 53/265; B64D 13/06; B64D 2013/0674; B64D 2013/0688; B64D 2013/0622
See application file for complete search history.

(56) References Cited

U.S. PATENT DOCUMENTS

| 3,805,495 | A | * | 4/1974 | Steel | B01D 45/16 |
| | | | | | 55/435 |
| 6,331,195 | B1 | | 12/2001 | Faust et al. | |
| 7,266,958 | B2 | | 9/2007 | Milde et al. | |
| 7,691,185 | B2 | | 4/2010 | Darke et al. | |
| 8,147,575 | B2 | | 4/2012 | Lucas | |
| 8,875,535 | B2 | | 11/2014 | Peacos, III et al. | |
| 2006/0275717 | A1 | * | 12/2006 | Jensen | B64D 13/00 |
| | | | | | 431/11 |
| 2015/0306528 | A1 | | 10/2015 | Mueller | |

(Continued)

FOREIGN PATENT DOCUMENTS

CN   105784400 A   7/2016
CN   205700139 U   11/2016

(Continued)

OTHER PUBLICATIONS

Extended European Search Report; Application No. 19213874.1; dated Apr. 3, 2020; 7 pages.

*Primary Examiner* — Lucas A Stelling
*Assistant Examiner* — Hafiz Muhammad Aamir
(74) *Attorney, Agent, or Firm* — Cantor Colburn LLP

(57) ABSTRACT

A water extractor for an environmental control system includes a primary duct having an inlet and an outlet, a scupper with a scupper inlet extending about the inlet of the primary duct, and a supply duct. The supply duct is in fluid communication with the primary duct and has a wall with an interior surface terminating at the scupper inlet. The interior surface defines one or more one swirl groove within the wall for gathering and conveying liquid water entrained in an airflow traversing the inlet duct to the scupper inlet. Environmental control systems, methods of making water extractors, and methods of removing water from air flows are also described.

14 Claims, 3 Drawing Sheets

(56) References Cited

U.S. PATENT DOCUMENTS

| | | |
|---|---|---|
| 2017/0203845 A1 | 7/2017 | Army et al. |
| 2017/0276415 A1 | 9/2017 | Ishiyama et al. |
| 2018/0133634 A1 | 5/2018 | Zager et al. |

FOREIGN PATENT DOCUMENTS

| | | |
|---|---|---|
| CN | 108067046 A | 5/2018 |
| DE | 2250841 A1 | 4/1974 |
| EP | 3320961 A1 | 5/2018 |
| EP | 3539635 A1 | 9/2019 |
| EP | 3552685 A1 | 10/2019 |
| GB | 960504 B2 | 6/1964 |
| IN | 2203DEL1996 | 8/2016 |
| WO | 2018105563 A1 | 6/2018 |

* cited by examiner

WATER EXTRACTORS AND METHODS OF MAKING WATER EXTRACTORS

BACKGROUND

The invention relates to environmental control systems, and more particularly to water extractors for environmental control systems.

Vehicles commonly employ air cycle machines to provide a flow of pressurized, conditioned air for environmentally controlled spaces on the vehicle. Air cycle machines provide compression, cooling and expansion required for an air cycle using a centrifugal compressor, air-to-air heat exchangers and an expansion turbine. The compressor, heat exchangers and turbine are interconnected with conduit and arranged such that a flow of hot, pressurized air is conditioned to have temperature, pressure and humidity suitable for the environmentally controlled space. Humidity is generally removed from the air flow using a water collector, which allows humidity to be removed from the air flow while at high pressure.

High pressure water extractors typically employ a swirler and scupper arrangement. The scupper is located downstream of the swirler and is in communication with the conduit wall. The swirler is located upstream of the scupper and arranged to swirl the air flow as it traverses the swirler. The swirl causes entrained water to against the conduit wall and enables collection in the scupper. The swirler presents resistance to the air flow, causing a pressure drop which translates as loss of power that could otherwise be used by the turbine.

Such water extractors have generally been considered suitable for their intended purpose. However, there remains a need for improved water extractors, environmental control systems employing water extractors, and method of making and removing water from air flows using water extractors. The present disclosure provides a solution to this need.

BRIEF DESCRIPTION

A water extractor for an environmental control system (ECS) is provided. The water extractor includes a primary duct having an inlet and an outlet, a scupper with a scupper inlet extending about the inlet of the primary duct, and a supply duct. The supply duct is in fluid communication with the primary duct and has a wall with an interior surface terminating at the scupper inlet. The interior surface defines one or more swirl grooves within the wall for gathering and conveying liquid water entrained in an airflow traversing the inlet duct to the scupper inlet.

In certain embodiments the swirl groove can terminate at the scupper inlet. The supply duct can define a flow axis. The swirl groove can trace a segment of a helical path extending about the flow axis. The swirl groove can define a flow area having a rectangular, trapezoidal, ellipsoid or parallelepiped shape by way of non-limiting example. The supply duct can include three or more layers interfused with one another. The interfused layers can define the swirl groove. The water extractor can swirlerless—no swirler located in the supply duct. An air cycle machine can be connected to the outlet of the water extractor.

In accordance with certain embodiments the supply duct can have a turning portion and an axial portion. The axial portion can be arranged between the turning portion of the supply duct and the scupper inlet. The swirl groove can span the axial portion of the supply duct. The swirl groove can extend at least partially along the turning portion of the supply duct. The turning portion can have an inner radius, a laterally opposite outer radius, and the swirl groove can intersect the outer radius of the turning portion of the supply duct. It is contemplated that the swirl groove may not intersect the inner radius.

It is also contemplated that, in accordance with certain embodiments, the swirl groove can be a first swirl groove and that a second swirl groove can be defined within a thickness of the supply duct wall. The interior surface defines five (5) swirl grooves within the thickness of the supply duct wall. Each of the supply swirl grooves can be located within a portion of the supply duct profile spanning an arc of about 180 degrees more or less.

An ECS is also provided. The ECS includes a water extractor as described above. An air cycle machine is fluidly coupled to the outlet of the primary duct. The supply duct has a turning portion and an axial portion. The axial portion is arranged between the turning portion and the scupper inlet. The supply duct defines a flow axis and the swirl groove traces a segment of a helical path extending about the flow axis. The swirl grooves extend at least along the turning portion of the supply duct, intersects the outer radius of the supply duct turning portion, and does not intersect the inner radius of the supply duct turning portion.

In certain embodiments the swirl groove can defines a flow area having a rectangular, trapezoidal, ellipsoid, or parallelepiped shape. The swirl groove can be a first swirl groove and the interior surface of the supply duct can define within the thickness of the supply duct wall one or more second swirl groove, and swirl grooves can be located within a portion of the supply duct interior surface spanning an arc of about 180 degrees more or less. It is contemplated that no swirler body be located within the inner diameter of the supply duct and that three or more layers interfused with one another define the swirl groove(s).

A method of making a water extractor includes interfusing at least three layers to define a primary duct having an inlet and an outlet, a scupper with a scupper inlet extending about the inlet of the primary duct, and a supply duct in fluid communication with the primary duct having a wall thickness and an interior surface terminating at the scupper inlet, the interior surface defines at least one swirl groove within the wall thickness.

A method of removing water from an air flow traversing an environmental control system includes, at a water extractor as described above, gathering liquid water entrained in an airflow entering the supply duct within the swirl groove. The liquid water is conveyed through the swirl groove to the scupper inlet for removal from the water extractor and the dried air communicated through the outlet of the primary duct to an air cycle machine connected to the outlet of the primary duct.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
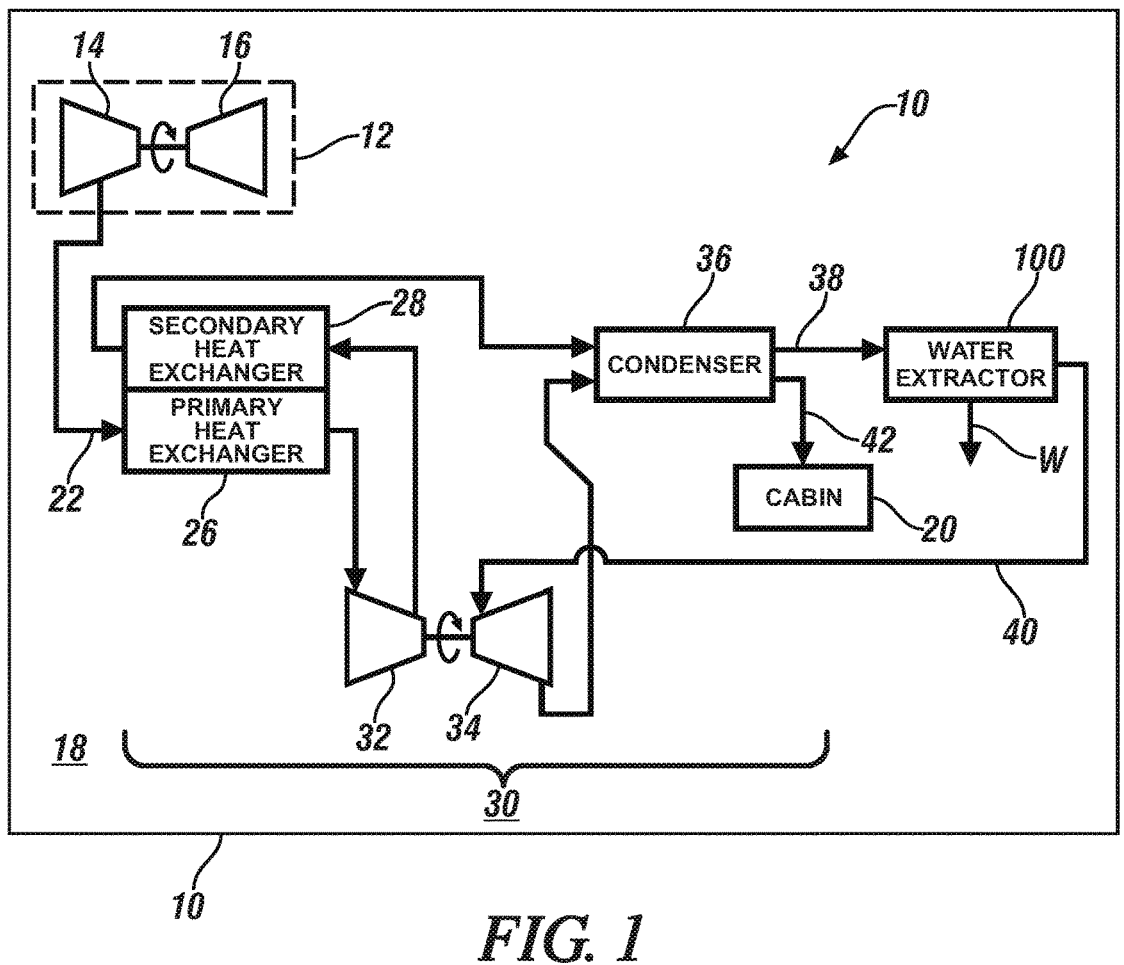
FIG. 1 is a block diagram of an environmental control system constructed in accordance with the present disclosure, showing bleed air extracted from a gas turbine compressor being conditioned and routed through a water extractor for provision to a conditioned space.

Reference will now be made to the drawings wherein like reference numerals identify similar structural features or aspects of the subject disclosure. For purposes of explanation and illustration, and not limitation, a partial view of an exemplary embodiment of a water extractor for an environmental control system in accordance with the disclosure is shown in FIG. 1 and is designated generally by reference character 100. Other embodiments of the water extractors, environmental control systems having water extractors, and methods of making water extractors and removing entrained water from air flows in accordance with the disclosure, or aspects thereof, are provided in FIGS. 2-7, as will be described. The water extractors, environmental control systems, and methods of removing entrained water in environmental control systems described herein can be used for conditioning enclosed spaces in vehicles, such as crew and passenger cabins in aircraft, though the present disclosure is not limited to crew and passenger cabins or to aircraft in general and instead can benefit any multiphase, liquid extraction application.

Referring to FIG. 1, an aircraft 10 is shown. Aircraft 10 includes a gas turbine engine 12 with a compressor 14 and a turbine 16, an environmental control system (ECS) 18, and a cabin 20. The ECS 18 fluidly couples the compressor 14 to cabin 20 and is configured and adapted to condition a high pressure air flow 22, e.g., bleed air, received from the compressor 14 for provision to the cabin 20. More particularly, the ECS 18 is configured and adapted to remove entrained water W from the high pressure air flow 22 and provide a flow of dry air 42 to the cabin 20 with pressure, temperature and humidity suitable for the cabin 20. In certain embodiments the compressor 14 can be located remotely from the aircraft 10 and can be, for example, a ground source of compressed air. In accordance with certain embodiments, the compressor 14 is can be operatively associated with the turbine 16 and can be, for example, an aircraft main engine or auxiliary power unit (APU) compressor.

The ECS 18 includes a primary heat exchanger 26, a secondary heat exchanger 28, an air cycle machine 30 with a compressor 32 and a turbine 34, a condenser 36, and the water extractor 100. The primary heat exchanger 26 is connected to the compressor 14 and is arranged to remove heat from the high pressure air flow 22 received from the compressor 14 of the gas turbine engine 12. The air cycle machine compressor 32 is connected to the primary heat exchanger 26 and is arranged to compress cooled high pressure air received from the primary heat exchanger 26. The secondary heat exchanger 28 is connected to the air cycle machine compressor 32 and is arranged to remove additional heat from the cooled high pressure air flow received from the air cycle machine compressor 32. It is contemplated that either (or both) the primary heat exchanger 26 and the secondary heat exchanger 28 be ambient air heat exchangers, heat from pressurized air flowing through either (or both) being transferred to a flow of ambient air flowing therethrough.

The condenser 36 is connected to the secondary heat exchanger 28 and is arranged to condense water vapor entrained in the cooled high pressure air flow received from the secondary heat exchanger 28 into liquid water W. This generates a multiphase condensed air flow 38, which the condenser 36 provides to the water extractor 100. The water extractor 100 in turn separates and removes the entrained liquid water W from the condensed air flow 38 received from the condenser 36, the water extractor 100 thereby generating a dry high pressure air flow 40. The dry high pressure air flow 40 is provided to the air cycle machine turbine 34, which expands the dry high pressure air flow 40 to pressure suitable for the cabin 20. The air cycle machine turbine 34 in turn provides the cooled air flow to the condenser 36, and therethrough to the cabin 20, as a flow of conditioned air 42 suitable for introduction into the cabin 20. Operation of the ECS 18 and/or the air cycle machine 30 can be along the lines of that set forth in U.S. Pat. No. 8,347,647, issued on Jan. 8, 2013, the contents of which are incorporated herein by reference in its entirety.

One challenge with the employment of water extraction devices is the pressure drop that the water extractor can impose on the air flow as the air flow traverses the water extractor. For example, while swirling can be employed to extract entrained water from high pressure air flows, the structure(s) used to impart the swirl to the flow can itself obstruct air flow through the system. To limit (or eliminate entirely) the pressure loss associated with such structures the water extractor 100 includes one or more swirl grooves 130 (shown in FIG. 3) for gathering and conveying water W entrained in the multiphase air flow provided by the condenser 36 to the water extractor 100.

Figure 2:
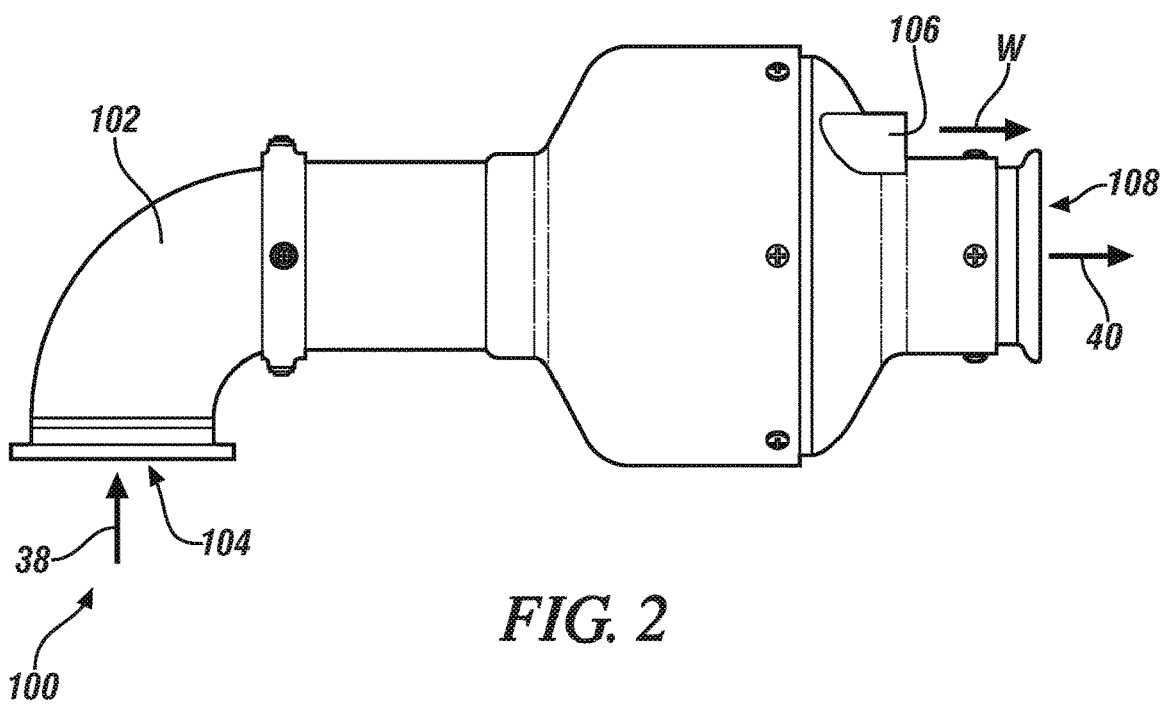
FIG. 2 is a side elevation view of the water extractor of FIG. 1, showing a flow of air with entrained water entering the water extractor and dried air exiting the water extractor.

With reference to FIG. 2, water extractor 100 is shown. Water extractor 100 includes a supply duct 102 with a supply duct inlet 104, one or more water outlet 106, and a dry air outlet 108. The supply duct inlet 104 is communicative with the one or more water outlet 106 and the dry air outlet 108 such that water W entrained in the condensed air flow 38 is extracted and removed from the condensed air flow 38. In this respect the entrained water W exits the water extractor 100 through the one or more water outlet 106 while the dry high pressure air flow 40 exits the dry air outlet 108 for communication to the air cycle machine 30 (shown in FIG. 1), which is connected to the dry air outlet 108 of the water extractor 100.

Figure 3:
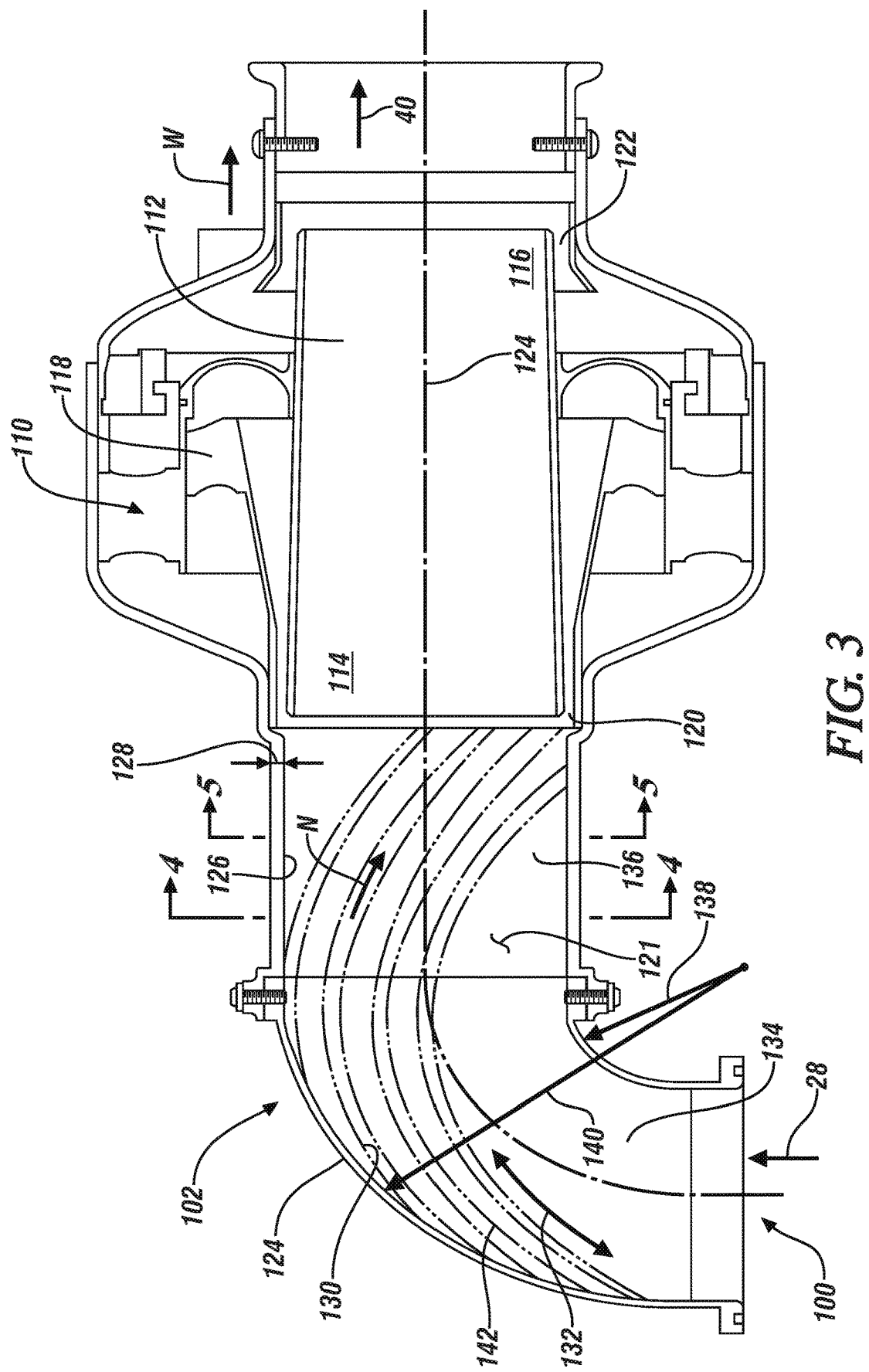
FIG. 3 is a cross-sectional side view of the water extractor of FIG. 1, showing a supply duct in communication with a primary duct and a scupper with the water extractor to remove entrained water from the air flow entering the supply duct.

With reference to FIG. 3, the water extractor 100 is shown in longitudinal cross-sectional. The water extractor 100 includes supply duct 102, a scupper 110, and a primary duct 112. The primary duct 112 is in fluid communication with the supply duct 102 and has a primary duct inlet 114, an opposite primary duct outlet 116, and is arranged along a flow axis 124. The primary duct outlet 116 is located downstream of the primary duct inlet 114 relative to the flow of air through the water extractor 100 along the flow axis 124. Notably, no swirler is located within the supply duct 102, the water extractor 100 (and more particularly the supply duct 102) thereby providing relatively little obstruction to the condensed air flow 38 entering the supply duct 102 from the condenser 36 (shown in FIG. 1).

Scupper 110 extends about the primary duct 112 and includes a labyrinthine portion 118, a scupper inlet 120, and a scupper outlet 122. The scupper inlet 120 and the scupper outlet 122 each extend about the primary duct 112 and are disposed in communication with labyrinthine portion 118 to provide water W to the labyrinthine portion 118. In this respect the scupper inlet 120 is arranged to provide a portion of the water W driven across an interior surface 121 (which terminates at scupper inlet 120) of the supply duct 102 to labyrinthine portion 118 while the scupper outlet 122 is arranged to allow air entering the scupper inlet 120 to return the air flow prior to the air flow exiting the water extractor 100. The labyrinthine portion 118 is communicative with the water outlet 106 for issuing water W from the water extractor 100. The labyrinthine portion 118 can operate and/or be arranged, for example, as described in commonly assigned U.S. Patent Application Publication No. 2018/0133634 A1, filed on Nov. 14, 2016, the contents of which are incorporated by reference in its entirety.

The supply duct 102 is arranged along the flow axis 124 and has a wall 126. The wall 126 is bounded internally by the interior surface 121 and has a thickness 128. The interior surface 121 defines therein, i.e., within the thickness 128 of the wall 126, one or more swirl groove 130. The one or more swirl groove 130 extends at least partially along the length of the supply duct 102 and terminates at the scupper inlet 120 to gather and convey to the scupper inlet 120 water W entrained within high pressure condensed air flow 38 provided to supply duct inlet 104. In the illustrated embodiment the one or more swirl groove 130 traces a segment 132 of a helical path extending about the flow axis 124. The helical twist of the segment 132 promotes adhesion of water W upon introduction to the swirl groove 130 by capillary action and angular momentum. In certain embodiments the helical twist of segment 132 can be selected to generally conform with the path that water W would otherwise follow along interior surface 121 were the interior surface 121 smooth about the entirety of its circumferential surface and axial length, the helical twist limiting the tendency of water W collected in the one or more swirl groove 130 from exiting the exit swirl groove 130 while traversing supply duct 102 and prior to delivery to the scupper inlet 120.

As also shown in FIG. 3, the supply duct 102 has a turning portion 134 and an axial portion 136. The axial portion 136 is arranged between the scupper inlet 120 and the turning portion 134. The turning portion 134 fluidly couples the axial portion 136 to the condenser 36 (shown in FIG. 1) for conveying condensed air flow 38 to the axial portion 136. In certain embodiments the at least one swirl groove 130 spans the axial portion 136 of the supply duct 102. In accordance with certain embodiments the at least one swirl groove 130 spans at least a portion of turning portion 134. It is also contemplated that the swirl groove 130 can span the entirely or either (or both) the turning portion 134 and the axial portion 136 of the supply duct 102. As will be appreciated by those of skill in the art in view of the present disclosure, the axial length of swirl groove 130 can be selected to place the inlet of swirl groove 130 at a location where, for example, entrained water would typically impact the interior surface of the supply duct 102 and thereafter return to the air flow absent the tendency of the swirl groove 130 to gather the water W once it impacts the interior surface 121 of the supply duct 102.

The turning portion 134 of the supply duct 102 has an inner radius 138 and an outer radius 140. The outer radius 140 is greater than the inner radius 138, i.e., has a greater radius of curvature than the inner radius 138. The at least one swirl groove 130 intersects the outer radius 140 but does not intersect inner radius 138. As will be appreciated by those of skill in the art in view of the present disclosure, defining the swirl groove 130 within the thickness 128 of the wall 126 of the supply duct 102 such that the swirl groove 130 does not intersect the inner radius 138 prevents the geometry of the swirl groove 130 from interrupting the portion of interior surface 121 where entrained water sheets without the assistance of swirling, i.e., on the surface portion bounding inner radius 138. Although shown and described herein as imparting a 90-degree turn to condensed air flow 38, it is to be understood and appreciated that the turning portion 134 can impart a turn of greater than 90 degrees or less than 90 degrees, as suitable for an intended application.

As shown in FIG. 3, the swirl groove 130 is a first swirl groove and the supply duct 102 has at least one second swirl grove 142. The second swirl groove 142 is similar to the first swirl groove 130 and additionally (a) extends in parallel with the first swirl groove 130 (b) starts at a location circumferentially offset from an inlet of the first swirl groove 130, and (c) terminates at a location circumferentially offset from the outlet of the first swirl groove 130. As will be appreciated by those of skill in the art in view of the present disclosure, the addition of one or more second swirl groove 142 allows the swirl grooves to overlap the splash area located on the interior surface 121 and intersected by the outer radius 140 where entrained water W tends to impact the interior surface 121, limiting the tendency of water impacting the splash area to return to the air flow traversing the supply duct 102.

Figure 4:
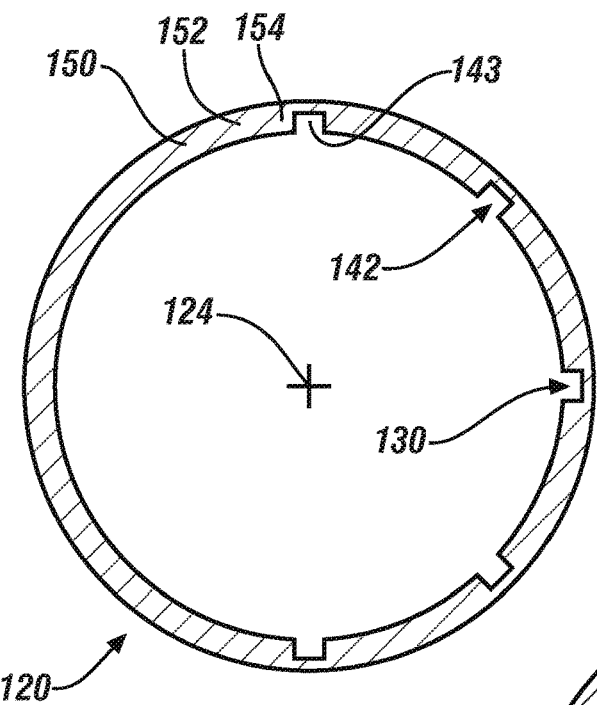
FIGS. 4 and 5 are axial cross-sectional views of the water extractor of FIG. 1, showing flow areas of swirl grooves defined within the wall thickness of the supply duct.
Figure 5:
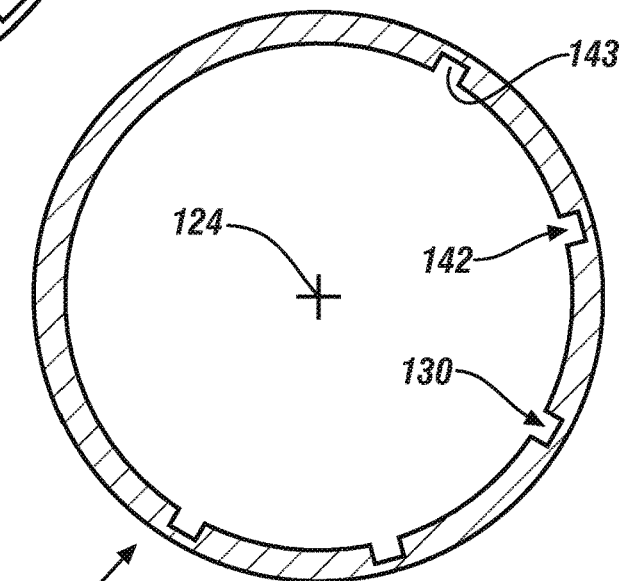

Referring now to FIGS. 4 and 5, the supply duct 102 is shown according to certain embodiments. In the embodiments shown the supply duct 102 has five (5) swirl grooves, i.e., first swirl groove 130 and four (4) second swirl grooves 142, defined by the interior surface 121 within the thickness 128 of the wall 126. This is for illustration purposes only and is non-limiting. Those of skill in the art will appreciate that water extractors described herein can have fewer than five swirl slots or more than five swirl slots, as suitable for an intended application.

Each of the swirl grooves 130, 142 are located within a common 180 degrees arc extending about the flow axis 124. The arc extending about the flow axis 124 having the swirl grooves is opposed by a conjugate 180 arc wherein the interior surface 121 of the supply duct 102 is smooth and uninterrupted, the arc inhabited by the swirl grooves 130, 142 rotating about the flow axis 124 according to the pitch of segment 132 of the helical path extending about the flow axis 124. In certain embodiments the portion of the interior surface 121 having the swirl grooves 130, 142 defines an arc that is larger than 180 degrees. In accordance with certain embodiments the portion of the interior surface 121 having the swirl grooves 130, 142 defines an arc that is smaller than 180 degrees.

Figure 6:
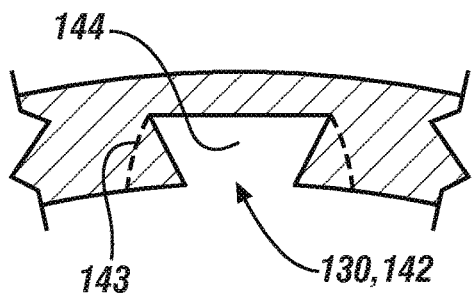
FIGS. 6 and 7 are partial axial cross-sectional views of the water extractor of FIG. 1, showing swirl grooves with flows areas with trapezoidal and parallelepiped shapes, respectively.

As shown in FIGS. 4 and 5 each of the swirl grooves 130, 142 can define a rectangular flow area 143. This is for illustration purposes only and is non-limiting as flow areas having other cross-sectional shapes can be defined by one or more of swirl groove 130, 142. For example, as shown in FIG. 6, one or more of the swirl grooves 130, 142 can define a flow area with a trapezoidal shape 144, which can be inverted relative to the surface within which the flow area with the trapezoidal shape 144 is defined. It is also contemplated that one or more of the swirl grooves 130, 142 can be defined with a flow area 143 having an ellipsoid shape. As will be appreciated by those of skill in the art in view of the present disclosure, the ellipsoid shape of flow area 143 facilitates egress of water channeled by the one or more swirl groove 130, 142 at the region having the flow area 143 with the ellipsoid shape.

Figure 7:
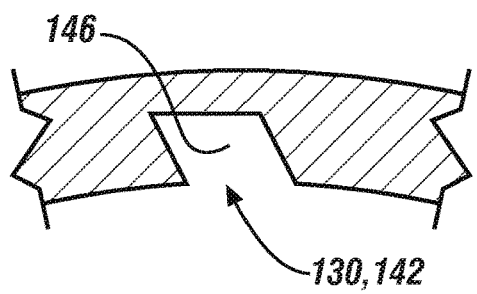

Alternatively (or additionally), as shown in FIG. 7, one or more of the swirl grooves 130, 142 can define a flow area with a parallelepiped shape 146. As will be appreciated by those of skill in the art in view of the present disclosure, trapezoidal and/or parallelepiped shapes can promote retention of water W within the respective swirl groove by increasing the motive area presented to water W for capillary action.

It is contemplated that the geometry of swirl grooves 130, 142 be defined using additive manufacturing technique, for example by three or more interfused layers 150-154 defining the swirl grooves 130, 142. As will also be appreciated by those of skill in the art in view of the present disclosure, the employment of additive manufacturing technique and interfused structure of the supply duct 102 allows the swirl grooves 130, 142 to be formed within the interior surface 121 on either (or both) the turning portion 134 and the axial portion 136 with flow areas selected to promote gathering and conveying water W through the respective swirl groove. For example, draft angles can be defined in the swirl grooves 130, 142 using additive manufacturing techniques that are otherwise prohibitively expensive (or impractical) to define using subtractive techniques and molding techniques. As shown in FIG. 6, the shape of the flow area defined by one or more the swirl grooves 130, 142 can change in shape along the longitudinal length of the swirl groove, for example, the flow area having a trapezoidal shape along portions where water is to be retained within the swirl groove (e.g., between a collection area and a discharge area), the flow area having an elliptical shape in regions where water exits the swirl area (e.g., adjacent the scupper).

It is contemplated that a method of making a water extractor, e.g., water extractor 100 (shown in FIG. 1), includes forming the water extractor 100 using an additive manufacturing technique, such as powder bed fusion or direct metal sintering by way of non-limiting example. For example, layers 150-154 can be interfused with one another to define at least a portion of the supply duct 102 including the swirl groove 130 (shown in FIG. 3). It is also contemplated that additive manufacturing technique can include forming each of the supply duct 102, the primary duct 112, and the scupper 110 using the additive manufacturing technique as a unitary structure.

It is additionally contemplated that a method of removing entrained water from an air flow traversing an ECS, e.g., water W (shown in FIG. 1) from condensed air flow 38 (shown in FIG. 1) in the ECS 18 (shown in FIG. 1), including receiving the condensed air flow at the water extractor 100. The entrained water W is gathered within the swirl groove 130 and conveyed through swirl groove 130 to the scupper 110 (shown in FIG. 3). The water thereafter exits the water extractor through water outlet 106 (shown in FIG. 2) and dry high pressure air flow 40 (shown in FIG. 1) communicated through the primary duct outlet 116 to the air cycle machine 30, which is connected to the primary duct outlet 116 by the air cycle machine turbine 34.

The methods and systems of the present disclosure, as described above and shown in the drawings, provide for water extractors with superior properties including water removal efficiency comparable (or equivalent) to that of water extractors with in-line swirlers without the efficiency loss associated with the obstruction such in-line swirlers present to flow traversing the water extractor. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A water extractor for an environmental control system, comprising:
  a primary duct having an inlet and an outlet;
  a scupper with a scupper inlet extending about the inlet of the primary duct; and
  a supply duct in fluid communication with the primary duct having a wall thickness and an interior surface terminating at the scupper inlet, wherein the interior surface defines at least one swirl groove within the wall thickness for gathering and conveying liquid water entrained in an airflow traversing the supply duct to the scupper inlet, and
  wherein:
  the supply duct defines a flow axis, wherein the swirl groove traces a segment of a helical path extending about the flow axis;
  the supply duct has a turning portion and an axial portion, and the axial portion arranged between the turning portion and the scupper inlet;
  the swirl groove spans the axial portion of the supply duct, and the swirl groove extends along the turning portion of the supply duct;
  the turning portion of the supply duct has an inner radius surface with an inner radius and an outer radius surface with an outer radius, the outer radius greater than the inner radius, the swirl groove intersects the outer radius of the turning portion, and the swirl groove does not intersect the inner radius; and
  the swirl groove is a first swirl groove and the supply duct has at least one second swirl groove, the second swirl groove is similar to the first swirl groove and additionally: (a) extends in parallel with the first swirl groove; (b) starts at a location circumferentially offset from an inlet of the first swirl groove; and (c) terminates at a location circumferentially offset from the outlet of the first swirl groove.

2. The water extractor as recited in claim 1, wherein the swirl groove terminates at the scupper inlet.

3. The water extractor as recited in claim 1, wherein the swirl groove is a first swirl groove,
  wherein the interior surface defines at least one second groove within the wall thickness of the supple duct.

4. The water extractor as recited in claim 3, wherein each of the swirl grooves are located within a portion of the interior surface of the supply duct, and an arc of about 180 degrees or less between an upstream end located in the supply duct and a downstream end at the scupper inlet.

5. The water extractor as recited in claim 3, wherein the interior surface defines five (5) swirl grooves within an interior of the supply duct wall thickness.

6. The water extractor as recited in claim 1, where the swirl groove defines a flow area having a rectangular, trapezoidal, or parallelepiped shape.

7. The water extractor as recited in claim 1, further comprising
an air cycle machine connected to the outlet of the water extractor.

8. The water extractor as recited in claim 1, wherein there is no swirler body located within the supply duct.

9. The water extractor as recited in claim 1, wherein the supply duct is formed by using an additive manufacturing technique, including powder bed fusion or direct metal sintering, to define the swirl groove.

10. An environmental control system, comprising:
a water extractor as recited in claim 1; and
an air cycle machine in fluidly coupled to the outlet of the primary duct.

11. The environmental control system as recited in claim 10, where:
the swirl groove defines a flow area having a ellipsoid, rectangular, trapezoidal, or parallelepiped shape;
wherein the swirl groove is a first swirl groove, wherein the interior surface defines at least one second groove within the wall thickness of the supple duct; and
wherein each of the swirl grooves are located within a portion of the interior surface of the supply duct, and span an arc of about 180 degrees or less between an upstream end located in the supply duct and a downstream end at the scupper inlet.

12. The environmental control system as recited in claim 10, wherein:
there is no swirler body located within the supply duct; and
wherein the supply duct includes is formed by using an additive manufacturing technique, including powder bed fusion or direct metal sintering, to define the swirl groove.

13. A method of making a water extractor for an environmental control system, the method comprising:
forming the water extractor using an additive technique, the water extractor including:
a primary duct having an inlet and an outlet;
a scupper with a scupper inlet extending about the inlet of the primary duct; and
a supply duct in fluid communication with the primary duct having a wall thickness and an interior surface terminating at the scupper inlet, wherein the interior surface define at least one swirl groove within the wall thickness for gathering and conveying liquid water entrained in an airflow traversing the supply duct to the scupper inlet, and
wherein:
the supply duct defines a flow axis, wherein the swirl groove traces a segment of a helical path extending about the flow axis;
the supply duct has a turning portion and an axial portion, and the axial portion arranged between the turning portion and the scupper inlet;
the swirl groove spans the axial portion of the supply duct, and the swirl groove extends along the turning portion of the supply duct;
the turning portion of the supply duct has an inner radius surface with an inner radius and an outer radius surface with an outer radius, the outer radius greater than the inner radius, the swirl groove intersects the outer radius of the turning portion, and the swirl groove does not intersect the inner radius; and
the swirl groove is a first swirl groove and the supply duct has at least one second swirl groove, the second swirl groove is similar to the first swirl groove and additionally: (a) extends in parallel with the first swirl groove; (b) starts at a location circumferentially offset from an inlet of the first swirl groove; and (c) terminates at a location circumferentially offset from the outlet of the first swirl groove.

14. A method of removing water from an air flow traversing an environmental control system, the method comprising:
at a primary duct having an inlet and an outlet,
a scupper with a scupper inlet extending about the inlet of the primary duct, and
a supply duct in fluid communication with the primary duct having a wall thickness and an interior surface terminating at the scupper inlet, wherein the interior surface define at least one swirl groove within the wall thickness for gathering and conveying liquid water entrained in an airflow traversing the supply duct to the scupper inlet, and
wherein:
the supply duct defines a flow axis, wherein the swirl groove traces a segment of a helical path extending about the flow axis;
the supply duct has a turning portion and an axial portion, and the axial portion arranged between the turning portion and the scupper inlet;
the swirl groove spans the axial portion of the supply duct, and the swirl groove extends along the turning portion of the supply duct;
the turning portion of the supply duct has an inner radius surface with an inner radius and an outer radius surface with an outer radius, the outer radius greater than the inner radius, the swirl groove intersects the outer radius of the turning portion, and the swirl groove does not intersect the inner radius; and
the swirl groove is a first swirl groove and the supply duct has at least one second swirl groove, the second swirl groove is similar to the first swirl groove and additionally: (a) extends in parallel with the first swirl groove; (b) starts at a location circumferentially offset from an inlet of the first swirl groove; and (c) terminates at a location circumferentially offset from the outlet of the first swirl groove;
gathering liquid water entrained in the air flow within the swirl groove;
conveying the liquid water through the swirl groove to the scupper; and
communicating dried air through the outlet of the primary duct to an air cycle machine connected to the outlet of the primary duct.

* * * * *